Dec. 6, 1938.  R. L. CARR  2,139,258
VEHICLE BODY
Original Filed March 20, 1936   3 Sheets—Sheet 2

Inventor
Raymond L. Carr

Dec. 6, 1938. R. L. CARR 2,139,258
VEHICLE BODY
Original Filed March 20, 1936   3 Sheets-Sheet 3

Inventor
Raymond L. Carr

Patented Dec. 6, 1938

2,139,258

UNITED STATES PATENT OFFICE 2,139,258

VEHICLE BODY

Raymond L. Carr, Boston, Mass.

Application March 20, 1936, Serial No. 69,783
Renewed August 10, 1938

19 Claims. (Cl. 296—44)

This invention relates to vehicle body constructions and more particularly to improved arrangements of windows, doors and cooperating parts. The present invention provides an arrangement of relatively movable window panels somewhat similar to that disclosed in my copending application Serial No. 59,113, filed January 14, 1936, while this invention also provides windows movable upwardly out of a body wall into direct juxtaposition in the general manner taught in my prior United States Patent Nos. 1,826,922 and 1,826,865.

In accordance with this invention the upwardly moving panels may have components of motion directed toward each other and toward the line defined by their contacting edges when they are in juxtaposition. The panels may conveniently have glass body portions with generally transparent adjoining edges having transversely extending edge surfaces which may be pressed firmly together when the panels are raised, thus to afford a butt-type joint, the component of motion of one panel toward the other aiding this engagement of the panel edges.

In order to assure the proper engagement of the panel edges throughout their heights without necessitating special accuracy in workmanship, at least one of the panels may include a frame with its glass body portion yieldably mounted therein so that the body portion may have a slight movement relative to the frame, thus permitting the glass to adjust itself to exterior pressures and permitting the panel edges firmly to engage each other throughout their heights. When such an arrangement is provided, I prefer to direct the panels so that they are out of engagement with each other except when substantially in their raised positions.

Further aspects of the invention relate to the arrangement of means to assure the accurate registration of the panel edges transversely of the body wall, the guiding means for the panels being effective to assure such engagement of the lower parts of their edges, and suitable means being provided to permit a similar result to be obtained at the upper parts of their edges. For this purpose, the vehicle may be provided with a valance having a channel-like portion in which the upper margins of the panels are engaged so that they are held in accurate alignment. Since one of the panels may ordinarily be supported on a door, the outer wall of the channel terminates in proximity to the vertical edge of the door panel and the hinge axis for the door is so arranged that the end of the panel may swing out of the channel when the door is moved to its open position.

Since it is highly desirable to provide means to engage the upper parts of the raised panels and to assure proper registration thereof, I have provided a construction which may be employed with particular advantage with a vehicle having a lowerable top, this construction precluding the movement of the panels into contact except when the top is raised and then automatically assuring such movement upon manipulation of the window regulators.

Another arrangement for assuring the proper registration of the upper parts of the panel edges involves the provision of overhanging upper rails to receive the upper margins of the raised panels, one of these rails, for example, being mounted on a swinging door.

In the preferred development of this embodiment of the invention, the upper door rail may have a hinge connection with the adjoining part of the body so that accurate alignment of the upper parts of the panels is maintained and the end of the overhanging rail section is directly supported. Such hinge means as well as the hinge means for the door or doors may be concealed so that an unusually smooth surface is provided for the side of the vehicle, thus enhancing its appearance and reducing its air resistance. For example, a vehicle of this character may be provided with two doors which have their adjoining edges supported by simple concealed hinge means and which have upper rails to receive the upper margins of the window, which are connected to each other and to the top by concealed hinge means, while the window opening provided below these rails may be occupied by two glass panels without any intervening post, the surfaces of these panels being substantially flush so that a smooth continuous transparent closure is afforded.

In the accompanying drawings:

Fig. 5 is a section indicated by line 5—5 of

Figure 1:
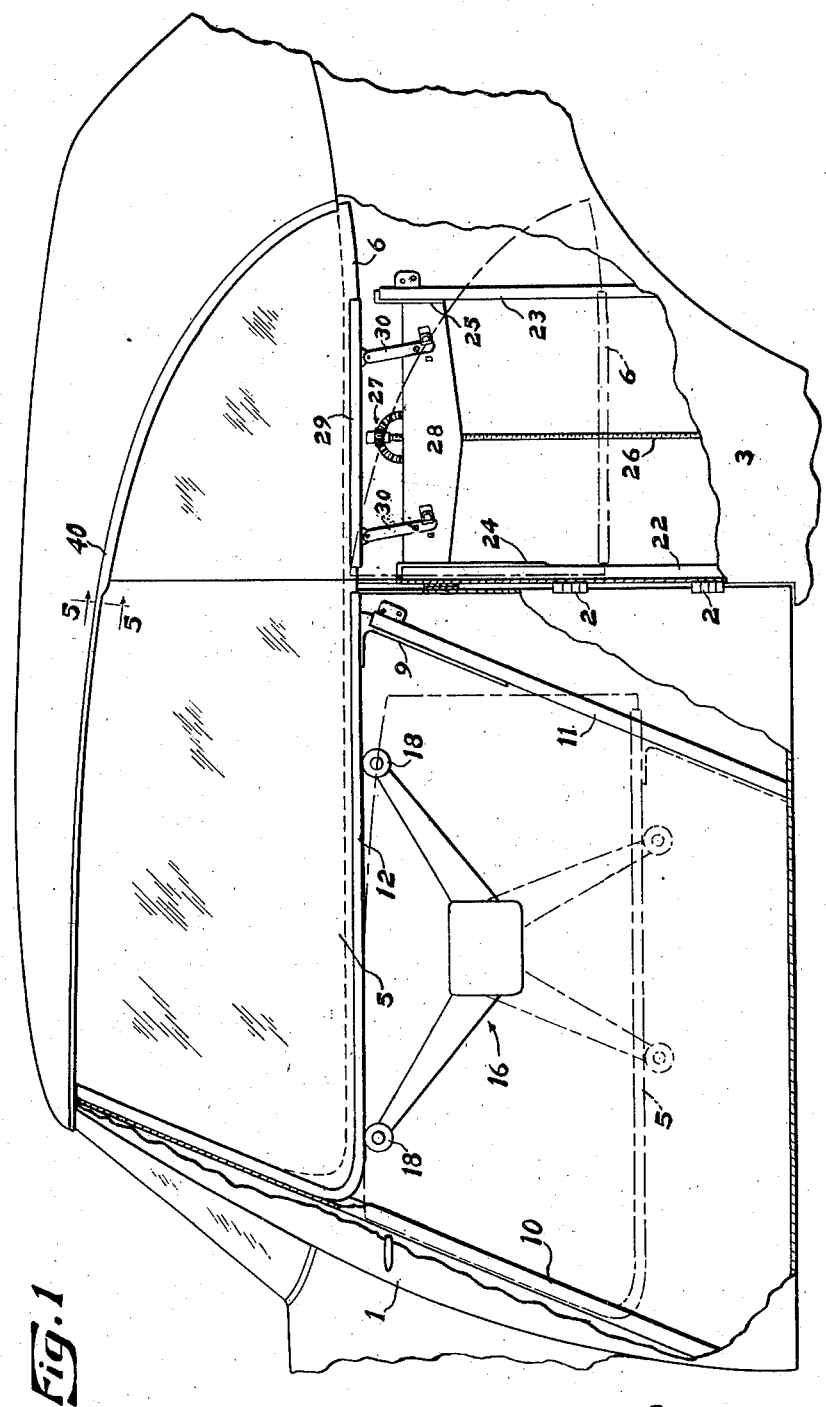
Fig. 1 is a side elevation of a portion of a vehicle body with parts of the outer wall of the body broken away and with the parts shown in optional positions by dot and dash lines.
Figure 6:
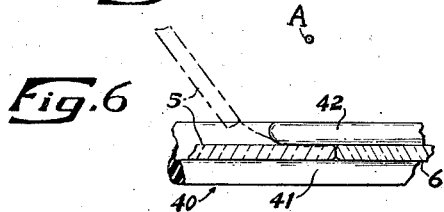
Figure 7:
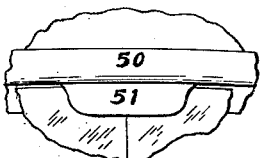
Figure 9:
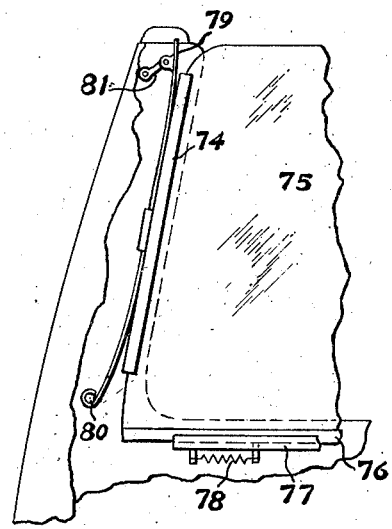
Figure 8:
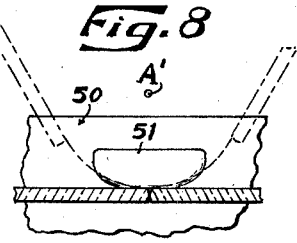
Figure 10:
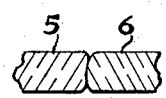
Figure 11:
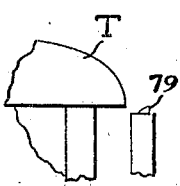
Figure 12:
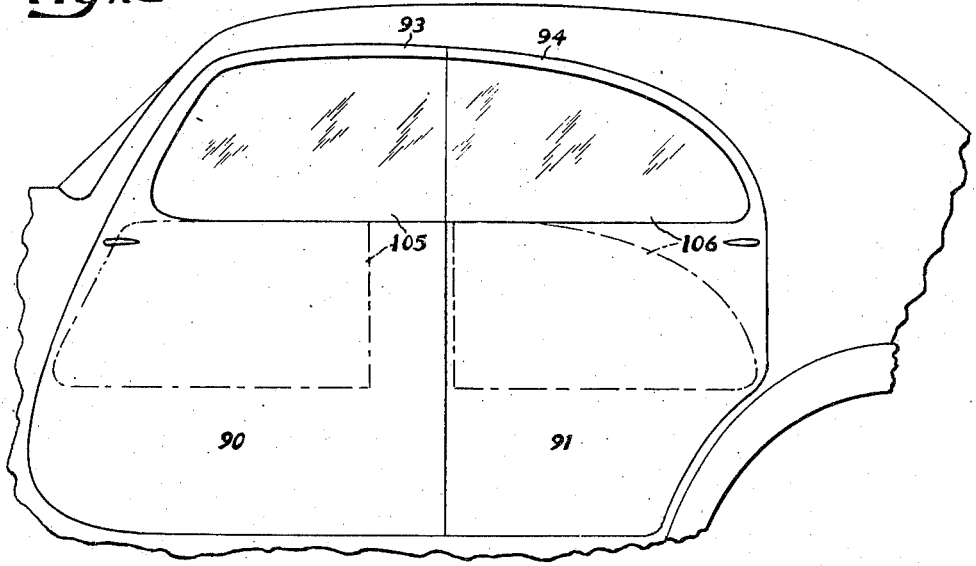
Figure 13:
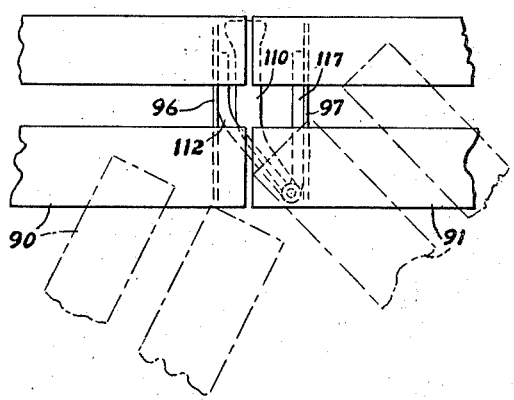
Figure 14:
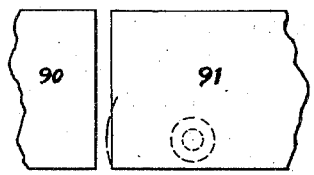
Figure 15:
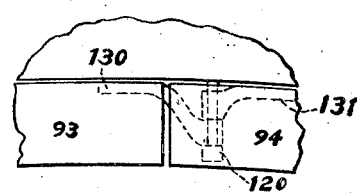
Figure 17:
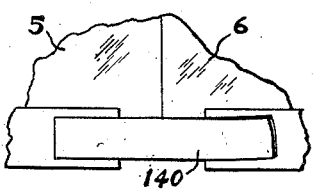
Figure 16:
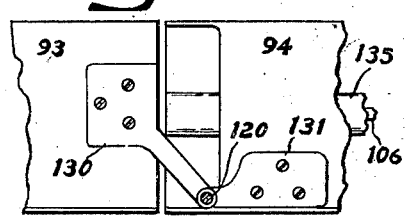

Fig. 1 and showing the relationship of the panels to the valance;

Fig. 6 is a horizontal sectional view showing the under part of a portion of the valance and portions of the panels;

Fig. 7 is an elevational detail showing an optional valance arrangement which may be employed when both panels are mounted on swinging doors;

Fig. 8 is a view similar to Fig. 6, but showing the assembly illustrated in Fig. 7;

Fig. 9 is a broken elevation of one end of a door showing optional panel mounting means;

Fig. 10 is a front elevation of a portion of the vehicle illustrated in Fig. 9;

Fig. 11 is a sectional detail showing the joint between glass panels;

Fig. 12 is a side elevation of a portion of a vehicle body with lowered panels shown in dot and dash lines;

Fig. 13 is a plan view of adjoining end portions of the doors of the body shown in Fig. 12 with the hinge means for the same shown in full and dotted lines, certain parts such as the window panels being omitted in this figure;

Fig. 14 is an enlarged plan view of portions of the doors shown in Fig. 13;

Fig. 15 is an enlarged elevational detail of the upper door rails, the hinge connecting and supporting means therefor being shown in dotted lines;

Fig. 16 is a plan view of the rails and hinge means shown in Fig. 15, a portion of the hinge means being shown in section; and Fig. 17 is an elevational detail of an optional guiding means which may be employed at the adjoining ends of the panels.

In accordance with this invention, two window panels may be arranged so that in their fully raised or closed positions they have transversely extending edge surfaces held in firm yieldable engagement, these edge surfaces defining a straight, substantially vertical line and the panels moving toward this line as they move into juxtaposition. Fig. 1 illustrates one typical arrangement which may be employed for this purpose. The body shown in this figure is provided with a swinging door 1 which is connected by hinges 2 to a rear body wall section 3 which as shown is a fixed section. A window panel 5 may be moved upwardly out of the door 1 to a raised position thereabove and a panel 6 may be movable upwardly out of the body wall section 3. Various lifting and guiding means may be provided for these panels, such means preferably being arranged, however, so that the panels approach each other with appreciable horizontal components of motion in the plane of the body wall. Lifting and guiding arrangements such as disclosed in my prior above-identified United States patents may be employed, or, as shown in Fig. 1, the front panel may conveniently move in a straight line upwardly and rearwardly inclined path. A front guide channel 10 may be arranged in the front of the door and in the door post to guide the front edge of the panel in this direction, while a rear guide 11 may be arranged parallel to the guide 10 and may engage a slider 9 connected to the frame 12 of the panel 5. The frame 12 preferably extends along the lower and front margins of the panel and its front portion is slidably received in the channel 10.

Preferably the glass body portion of the panel is disposed in a rubber mounting received in the frame 12, this rubber mounting being arranged so that the glass panel may have a slight movement in its own plane relative to the frame, although being held against appreciable transverse movement by the frame and supporting means. Thus the arrangement may be similar to that disclosed in my above-identified application which is incorporated herein by reference, or the mounting of the panel may be similar to that illustrated in Fig. 2 with reference to panel 6.

Any suitable lifting mechanism may be provided to lift and to support the panel 5 in any desired adjusted position, i. e., either in the lowered position shown in dot and dash lines in Fig. 1, the raised position shown in full lines, or any position therebetween. For purposes of illustration I have shown a lifter 16 having two similar swinging arms with rollers 18 upon which the horizontal part of the frame 12 rests.

Figure 2:
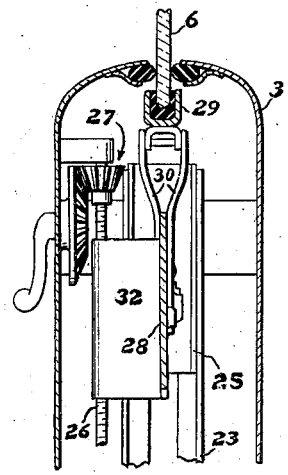
Fig. 2 is a transverse section of the upper part of the rear body wall section, also showing parts of the window guiding and supporting mechanism.

The rear panel 6 may be guided and lifted in the same manner as the front panel 5 if desired, but since the rear wheel housing may often interfere with such an arrangement, I prefer to provide guiding means which directs the panel upwardly in a substantially straight-line path and permits the longitudinal movement of the panel only at the upper end of this path. For this purpose straight guides 22 and 23 may be provided, suitable sliders 24 and 25 being movable in these guides and supporting a plate 28 which moves in a straight-line path defined by the guides 22 and 23. As shown in Fig. 2, the guides 22 and 23 may comprise laterally spaced angles and the sliders may be in the form of channel sections slidably received by these angles. Such an arrangement permits proper definition of the path of movement of the panel and yet affords room for the movement of the glass body portion of the panel. The guide 11 for panel 5 obviously may be similarly arranged. Any suitable lifting means may be employed to direct the panel 6 upwardly. For this purpose a threaded shaft 26 may be operable by suitable gearing 27, the shaft engaging an internally threaded member 32 connected to the plate 28. Preferably the threading of the shaft is irreversible so that the panel may stop in any desired position.

Figure 3:
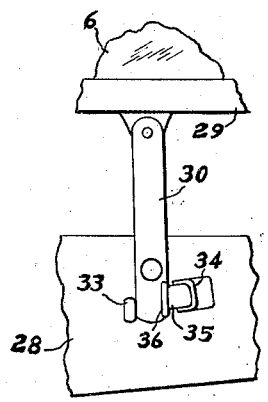
Fig. 3 is an elevational detail of a portion of the rear window supporting and guiding mechanism.

The panel 6 preferably is provided with a frame 29 which has pivotal connections with swingable arms 30 which are pivotally connected to the plate 28, these arms being arranged in pairs to swing in a vertical plane. As shown in Figs. 1 and 3, the plate 28 is provided with stop members 33 to limit the movement of the arms 30 in one direction, thus limiting the rearward movement of the panel 6 relative to the plate. Socket members 34 preferably may be secured to the plate, being provided with compressible rubber elements 35 which engage ears 36 on the lower ends of arms 30, normally urging these arms towards a vertical position. Thus if the vehicle is provided with a lowerable top and the top is lowered, the panel 6 moves upwardly in a straight-line path and the arms 30 do not swing. If, however, the top is raised, the upper and rear margin of the panel may engage in a channel-like portion of the top which has a camming action tending to urge the panel forwardly and somewhat downwardly relative to plate 28 as the panel approaches the upper end of its path. Thereupon the arms 30 swing about their pivotal supports, compressing the yieldable members 35, the ears 36 engaging the walls of members 34 to limit this movement if the panel 5 is not raised. Obviously any other means having a similar operation may be employed for this purpose. Thus yieldable springs may be substituted for the members 35, if desired, or the cam means provided by the top rather than engaging the margin of the panel may engage the end of the frame at the lower part of the panel.

Figure 4:
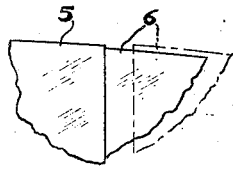
Fig. 4 is an elevational detail showing relative positions of the upper portions of the windows.
Figure 5:
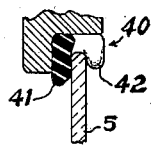

Preferably the arms 30 are arranged so that they are slightly inclined upwardly and forwardly when the top is lowered. Under these conditions, the approximate position of the upper part of the panel 6 is shown by dot and dash lines in Fig. 4. When the top is raised, the panel moves forwardly and downwardly relative to the plate 28 as the panel approaches its raised position. Thus under these conditions the upper edge of the panel is in the approximate position shown in full lines in Fig. 4, the upper edges of the panels then being held in alignment by the valance 40. This valance is more particularly shown in Figs. 1, 5 and 6 and may conveniently be formed of rubber or the like. It comprises inner and outer wall portions 41 and 42 which cooperate to provide a channel receiving the upper and rear edge of the panel 6. The outer wall of this channel, however, projects slightly in front of the line defined by the meeting edges of the panel, as shown in Figs. 1 and 6, so that the upper rear corner of panel 5 is also received thereby. Thus this portion of the front panel is held in accurate alignment with the rear panel. The inner wall of the channel extends forwardly to engage the major portion or substantially all of the upper margin of the raised panel 5.

Preferably the hinge means for the door is so arranged that the hinge axis A (Fig. 6) is positioned to permit the rear edge of the panel 5 to swing out of the channel provided by the valance when the door is opened with only slight distortion of the rubber, the path of the outer corner of the rear edge of this panel being indicated by the dot and dash line arc of Fig. 6.

The upper ends of the panel edges are guided into and held in accurate registration by the valance while the supporting means for the panel frames hold their lower ends in registration. To aid this result, rubber strips may extend along the slots in the top of the body wall sections, as shown in Fig. 2, this arrangement being taught in my United States Patent No. 1,826,865.

It is now evident that the panel 5 may move upwardly along a straight-line rearwardly inclined path, while the rear panel 6 moves upwardly along a straight-line substantially vertical path. When panel 6 engages the top, this panel deviates from its straight-line path and moves forwardly toward the panel 5. In order to permit the movements of the panels toward each other, the upper parts of the end walls of the body wall sections are cut away in the manner taught in my United States Patent No. 1,826,922. When the panel 5 moves against the panel 6, the rubber mounting of the former is slightly compressed so that the panel edges are firmly pressed together. Furthermore, as more fully discussed in my above-identified copending application, and with particular reference to Figs. 8 and 9 thereof, such an arrangement permits the panels to be self-adjusting so that they may fit together throughout their heights, while this rubber mounting also affords an automatic take-up arrangement. In fact, a feature of the invention is the arrangement of the parts engaging the panel edge surfaces so that extreme accuracy is not necessary and yet so that the adjoining edges may properly engage each other. For example, the exact vertical positioning of the panels at the tops of their paths is not a critical factor.

It is of course evident that when the panels are contacting and plate 28 is moved downwardly, the members 35 cause arms 30 to swing rearwardly until the panel is returned to its vertical path.

The panel edges may have various forms such as disclosed in my above-identified copending application or shown in Fig. 11, it being evident that either plain glass, laminated safety glass or "case-hardened" glass may be employed. Narrow opaque sealing strips extending along the edges of safety glass panels do not materially impair the continuous transparent nature of the composite closure afforded by the panels and such arrangements are regarded as within the scope of the following claims.

The top may be of any desired construction, being either permanent or lowerable. For example, if the top is lowerable, it may, if desired, be of the general type disclosed in my copending application Serial No. 35,610, filed August 10, 1935.

The general arrangement which has been described may also be employed when both of the body wall sections are doors. When such an arrangement is employed, the hinged ends of the doors are juxtaposed to each other and the hinge axis is arranged so that the glass edges are only spaced apart a short distance when the door or doors are fully opened. Thus the glass is protected against undue shock upon door closing.

However, in order to permit opening of the rear door when two adjoining doors are provided, a valance 50 of the type shown in Figs. 7 and 8 may be provided. Thus instead of providing a continuous channel for the rear panel, the valance is rabbeted so that the panels may swing outwardly while still engaging or being juxtaposed to the overhanging valance surface; thus the rear panel may properly be brought into engagement with the front panel upon door closing. Valance 50 is provided with an outer depending portion 51 which has its inner surface curved outwardly and forwardly and backwardly from the region of the juxtaposed edges of the panels, as shown in Fig. 8. Thus the member 51 defines a short channel effective to hold the upper parts of the panels in alignment. This valance as well as valance 40 may be reinforced by resilient sheet metal or the like, if desired. The dot and dash line arcs in Fig. 8 show the paths of the outer corners of the panels, the position of the projection of the hinge axis being designated by A' in this figure, it being evident that slight distortion of the member 51 occurs when a door is opened or closed.

Figs. 9 and 10 illustrate one optional arrangement which may be employed to cause the panel edges to contact only when the top of the vehicle is in raised position. Thus the front panel 75 may be provided with a lower frame 76 which is slidable in the frame 77, the latter being restrained to follow a straight-line up-and-down path, and suitable spring means 78 connecting the frames 76 and 77 so that normally the panel 75 is urged forwardly, i. e., toward the left as viewed in Fig. 9.

This arrangement of the panel framing is of the general character disclosed in my United States Patent No. 1,923,077, which more fully illustrates the arrangement of such a slidable panel frame. The front edge of the upwardly moving panel 75 may engage a channel 74 which is connected to a leaf spring 79, the lower end of the latter having a fixed pivotal support 80 and its upper end being supported by a link or shackle 81. The upper extremity of the spring 79 preferably projects slightly above the door post, as shown in Figs. 9 and 10. When the top T is lowered, the panel 75 may remain in its vertical path, but, when the top is raised, a portion of the top engages the upper end of the spring 79 and causes the spring to bulge rearwardly; thus when the panel 75 approaches the upper end of its path, it is moved rearwardly against the action of spring 78 to engage the rear panel.

As shown in Fig. 10, the upper end of the spring 79 preferably is beveled readily to engage the top T in a manner similar to the action of a door latch, thus permitting the mechanism to operate when the door closes. It is of course evident that various other equivalent arrangements might be employed, for example, a suitable toggle mechanism might be substituted for the spring 79 and be similarly actuable when the top is raised.

The arrangements which have so far been described obviously may be employed with a vehicle having either a permanently raised top or with a vehicle having a lowerable top, while the construction shown in Figs. 12 to 16 is particularly applicable to vehicles having permanently raised tops, although it could be employed with a vehicle having a lowerable top.

The body shown in Fig. 12 is provided with a front door 90 and a rear door 91 and with panels 105 and 106 corresponding to the panels 5 and 6 of Fig. 1, these panels being provided with lifting and guiding mechanisms similar to those illustrated in Fig. 1 or any equivalent mechanisms. In accordance with this embodiment of the invention, however, the doors are provided with upper rail portions 93 and 94 which receive the upper margins of the windows in the conventional manner. The adjoining ends of these rail sections may be supported by a hinge connection which is particularly illustrated in Figs. 15 and 16, this hinge connection being concealed and arranged in the general manner of the door hinges which are illustrated in Figs. 13 and 14.

As shown in these figures, the doors may be provided with spaced end walls 96 and 97, the exposed portions of the doors having flanges which extend beyond these end walls toward each other and which are separated by a conventional clearance crack. The door post 110 may be disposed between the end walls of the doors which may be connected thereto by hinge leafs 112 and 117. The hinge knuckles for the hinges are disposed in spaced relation to the crack between the doors, i. e., for example, adjoining the wall 97 of the rear door, so that the front edge of the outer flange of this door may swing inwardly, while the front door may swing outwardly. This arrangement of the hinge axis permits the front corner of the rear door 91 to follow an arcuate path such as shown in Fig. 14, so that the corner of the door does not move substantially into the crack between the doors and so that interference between the same is precluded, although concealed hinge means is provided.

The hinge support for the upper rails 93 and 94 comprises a pin 120 depending from the top and having an enlarged lower end. Brackets 130 and 131 are secured to these rails and have arms with bearing portions pivotally engaging the pin 120. These parts may be arranged laterally outward of and above the channels which receive the upper edges of the glass panels, one of these channels being shown in Fig. 16 and designated by numeral 135.

It is evident that the body shown in Fig. 12 is arranged so that the crack between the body portions of the doors may be aligned with the joint between the glass panels and with the crack between the upper door rails, thus providing an unusually neat appearance, particularly when concealed hinge means are afforded.

Fig. 17 illustrates an optional feature which may be employed to aid the proper engagement of the lower parts of the window panels. For this purpose the frame of one of the panels, as the panel 5, may be provided with rearwardly projecting sheet metal members 140 which are adapted to straddle and resiliently to engage the frame of the rear panel 6. To facilitate this engagement the free ends of the elements preferably are flared outwardly and may also be flared upwardly. It is evident that such elements facilitate accurate registration of the lower edges of the panels, and are quite similar to the elements 78 of my copending application Serial No. 59,113.

Obviously the principles of this invention are complied with when one of the panels is raised and the cooperating panel moves toward the adjoining edge of the raised panel. Thus one panel may be permanently raised or may be secured to the top, being movable with the same to lowered position if desired, while the cooperating panel may swing in its own plane, may move upwardly and endwise as shown herein, may move vertically and then endwise as also shown herein, or may move longitudinally to engage the other raised panel. Any of these arrangements involves the movement of one panel with a component directed toward the edge of the other raised panel, so that the panels may be pressed yieldably into endwise engagement. Accordingly the glass edges may cooperate to afford a narrow, weather-tight, seam-like joint which is unobtrusive and which permits an unusually smooth, attractive appearing closure to be provided.

I claim:

1. Vehicle body comprising a body wall having a door section and an adjoining section, transparent closure panels mounted on the respective sections and having adjoining transparent margins with transversely extending edge surfaces, and means supporting the panels and yieldably urging them toward each other in the plane of the wall thereby pressing their edge surfaces into firm contact.

2. Vehicle body comprising a body wall having a door section and an adjoining section, transparent closure panels mounted on the respective sections and having adjoining transparent margins with transversely extending edge surfaces, and means supporting the panels and yieldably urging them toward each other in the plane of the wall thereby pressing their edge surfaces into firm contact, said means permitting a limited turning movement of one panel in its own plane, so that the panel edges are held in contact throughout their heights.

3. Vehicle body comprising a body wall having a door section and an adjoining section respectively providing pockets, a closure panel carried by each section, lifting and guiding means for said panels directing them from lowered positions in said pockets to raised juxtaposition above the sections, said means directing the panels upwardly into juxtaposition with components of movement directed toward each other, one of said panels including a frame and a glass body portion mounted for slight yieldable movement in its own plane relative to its frame, said panels having contacting glass edges when in raised juxtaposition, the yieldable mounting of the panel and the components of movement toward each other assuming the firm yieldable contact of the edges.

4. Vehicle body comprising a body wall having a door section and an adjoining section, transparent closure panels mounted on the respective sections and having adjoining transparent margins with transversely extending edge surfaces, means supporting the panels and yieldably urging them toward each other in the plane of the wall thereby pressing their edge surfaces into firm contact, and a top having a valance with an inner wall and an outer wall defining a channel to receive the upper edge of the panel supported by the door section, the outer wall terminating near the adjoining panel edges so that the door panel may swing out of said channel when the door is opened.

5. Vehicle body comprising a body wall having a door section and an adjoining section respectively providing pockets, a closure panel carried by each section, lifting and guiding means for said panels directing them from lowered positions in said pockets to raised juxtaposition above the sections, said means directing the panels upwardly into juxtaposition with components of movement directed toward each other, one of said panels including a frame and a glass body portion mounted for slight yieldable movement in its own plane relative to its frame, said panels having contacting glass edges when in raised juxtaposition, the yieldable mounting of the panel and the components of movement toward each other assuming the firm yieldable contact of the edges, and a top having a valance with an inner wall and an outer wall defining a channel to receive the upper edge of the panel supported by the door, the outer wall terminating near the adjoining panel edges so that the door panel may swing out of said channel when the door is opened.

6. Vehicle body comprising a body wall having a door section and an adjoining section, closure panels mounted on the respective sections and having adjoining transversely extending edge surfaces, and means supporting the panels and yieldably urging them toward each other in the plane of the wall thereby pressing their edge surfaces into firm contact, said wall sections having upper rails with channels receiving the upper margins of the raised panels and holding their upper portions in coplanar relation, the rail for the door section being movable with that section.

7. Vehicle body comprising a body wall having a door section and an adjoining section, closure panels mounted on the respective sections and having adjoining transversely extending edge surfaces, means supporting the panels and yieldably urging them toward each other in the plane of the wall thereby pressing their edge surfaces into firm contact, said wall sections having upper rails with channels receiving the upper margins of the raised panels and holding their upper portions in coplanar relation, and hinge means connecting said upper rails.

8. Vehicle body comprising a body wall having a door section and an adjoining section, closure panels mounted on the respective sections and having adjoining transversely extending edge surfaces, and means supporting the panels and yieldably urging them toward each other in the plane of the wall thereby pressing their edge surfaces into firm contact, said door section having hinge means about which it swings and having an upper rail section receiving the upper edge of the raised door panel, said upper rail being provided with a hinge forming part of the hinge means and cooperating in defining a hinge axis.

9. Vehicle body comprising a body wall having a door section and an adjoining section, closure panels mounted on the respective sections and having adjoining transversely extending edge surfaces, and means supporting the panels and yieldably urging them toward each other in the plane of the wall thereby pressing their edge surfaces into firm contact, said body including a lowerable top, said means being arranged so that the panels contact only when the top is raised.

10. Vehicle body comprising a body wall having a door section and an adjoining section, closure panels mounted on the respective sections and having adjoining transversely extending edge surfaces, and means supporting the panels and yieldably urging them toward each other in the plane of the wall thereby pressing their edge surfaces into firm contact, said body including a lowerable top, said means being arranged so that the panels are movable into contact only when the top is raised, said means yieldably supporting one of the panels so that it may be engaged by the raised top with a camming action to cause it to move longitudinally toward the other panel.

11. Vehicle body comprising a body wall including a swinging door section, a panel carried on said section, a valance having a channel portion receiving the end of the upper edge of the panel, said end being swingable in a substantially endwise direction out of said channel portion when the door is opened.

12. Vehicle body comprising a body wall including adjoining sections, a panel mounted on one of said sections and having an end surface adjoining the second section, said second section providing a pocket, a second panel movable out of said pocket to a raised position where its end engages the end surface of said first-named panel, the second panel having a longitudinal movement toward the end surface of the second panel as it moves into engagement with the same, said second panel including a frame portion and a body portion yieldably mounted on the frame portion and movable in its own plane relative to its frame upon engaging the first panel.

13. Vehicle body comprising a body wall having adjoining sections each providing a pocket, a pair of panels movable respectively out of the pockets into raised juxtaposition thereabove, lifting and guiding means for said panels, the juxtaposed panels having substantially vertical contacting edges defining a line of contact, said means directing one of said panels along a straight-line inclined path from its lowered position toward said line of contact, said means directing the other panel from its lowered position in a direction substantially parallel to said line, said second panel then being movable longitudinally toward said line to contact the first panel.

14. Vehicle body comprising a body wall having a pocket therein, a panel movable upwardly out of the pocket to a raised position thereabove, lifting and guiding means in said pocket defining a straight-line path for said panel, said means permitting but yieldably opposing longitudinal movement of the panel out of the straight-line path, and a lowerable top, said top, when in raised position, being effective in causing the longitudinal movement of the panel, whereby the panel follows a straight-line path except when the top is raised.

15. Vehicle body comprising a body wall including adjoining sections, one of which is a door, said sections having upwardly projecting posts at their remote ends, and overhanging rail portions connected to said posts and cooperating therewith and with the body portions of the sections in enclosing a single window opening, juxtaposed windows in said opening, the upper margins of the windows engaging said rail portions.

16. Vehicle body comprising a body wall including adjoining sections, one of which is a door, said sections having upwardly projecting posts at their remote ends, and overhanging rail portions connected to said posts and cooperating therewith and with the body portions of the sections in enclosing a single window opening, juxtaposed windows in said opening, the upper margins of the windows engaging said rail portions, and hinge means connecting said sections and between said rail portions, whereby the overhanging rail portions are supported.

17. Vehicle body comprising a pair of juxtaposed swinging doors separated by a single uninterrupted clearance crack, and hinge means supporting the juxtaposed ends of the doors and concealed thereby, said hinge means permitting either door to be swung to open position independently of the position of the other, the hinge axis for one door being at the same side of the clearance crack as the hinge axis for the other door.

18. Vehicle body comprising a body wall having a pocket therein, a panel movable upwardly out of the pocket to a raised position thereabove, lifting and guiding means in said pocket for said panel, a second panel with which the first-named panel may contact, a lowerable top, said top, when in raised position, being effective in causing the movement of the first panel into contact with the second panel when said lifting and guiding means is being actuated, whereby the first panel, when raised, remains out of contact with the second panel except when the top is raised.

19. Vehicle body comprising a body wall including adjoining sections, one of which is a door, said sections having upwardly projecting posts at their remote ends, and overhanging rail portions connected to said posts and cooperating therewith and with the body portions of the sections in enclosing a single window opening, juxtaposed windows in said opening, the upper margins of the windows engaging said rail portions, hinge means connecting the adjoining ends of said sections, and concealed hinge means connecting the adjoining ends of said rails.

RAYMOND L. CARR.